(12) United States Patent
Hill et al.

(10) Patent No.: US 12,164,167 B2
(45) Date of Patent: Dec. 10, 2024

(54) MODULAR PEDESTAL DISTRIBUTION HUB

(71) Applicant: Clearfield, Inc., Minneapolis, MN (US)

(72) Inventors: John P. Hill, Oak Grove, MN (US);
Daniel J. Johnson, Blaine, MN (US);
Randy T. VanHorn, Princeton, MN
(US); Brian K. Larson, Andover, MN
(US); Brian S. Schrand, Cincinnati,
OH (US)

(73) Assignee: Clearfield, Inc., Minneapolis, MN (US)

( * ) Notice: Subject to any disclaimer, the term of this patent is extended or adjusted under 35 U.S.C. 154(b) by 136 days.

(21) Appl. No.: 17/830,797

(22) Filed: Jun. 2, 2022

(65) Prior Publication Data

US 2023/0393360 A1 Dec. 7, 2023

(51) Int. Cl.
*G02B 6/00* (2006.01)
*G02B 6/38* (2006.01)
*G02B 6/44* (2006.01)

(52) U.S. Cl.
CPC ......... *G02B 6/4446* (2013.01); *G02B 6/3897* (2013.01); *G02B 6/4452* (2013.01)

(58) Field of Classification Search
CPC .. G02B 6/4446; G02B 6/3897; G02B 6/4452; G02B 6/00; G02B 6/44524
See application file for complete search history.

(56) References Cited

U.S. PATENT DOCUMENTS

| | | | |
|---|---|---|---|
| 9,411,118 B2* | 8/2016 | Matz | G02B 6/4452 |
| 2010/0237757 A1* | 9/2010 | Wakileh | H04Q 1/025 |
| | | | 312/294 |
| 2014/0314384 A1* | 10/2014 | Nair | G02B 6/4452 |
| | | | 385/135 |

* cited by examiner

*Primary Examiner* — Jennifer Doan
(74) *Attorney, Agent, or Firm* — Troutman Pepper Hamilton Sanders LLP; Alison L. McCarthy; Mark Lehi Jones (57) ABSTRACT

A modular pedestal distribution hub includes a pedestal and a cover attaching to and covering a portion of the pedestal. The pedestal includes a first pedestal section and a second pedestal section. Each of the first pedestal section and the second pedestal section are configured to be attached to form the pedestal. The cover includes a front cover and a back panel. The front cover and the back panel are configured to be attached to form the cover.

18 Claims, 6 Drawing Sheets

MODULAR PEDESTAL DISTRIBUTION HUB

TECHNICAL FIELD

The present disclosure relates generally to optical fiber distribution systems and, more specifically, to fiber distribution hubs (FDH) for optical fiber communication networks.

BACKGROUND

Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber or to provide termination connection ports for end users at which one or more fibers may be branched from a feed cable. In instances when the connection may be exposed to weather conditions, an essentially waterproof configuration of components is needed.

To interconnect the cables, various cable connector designs provide for low insertion loss and stability. Some example connectors may include, but are not limited to, SC, Dual LC, LC, ST and 1V1P0 connectors. In most of these designs, ferrules (one in each connector, or one in the connector and one in the apparatus or device), each containing an optical fiber end, are butted together end to end and light travels across the junction.

With the increasing desire for completely optical networks, "fiber to the premises" (FTTP) or "fiber to the home" (FTTH) systems are being developed to provide optical fibers that extend from the source to the site of the end-user. For this purpose, optical fiber distribution hubs (FDH) and connection terminals are needed for interconnection of the feed lines with drop cables that extend to various user locations within a certain distance from the terminals. Further, there is a need for flexible, customizable fiber distribution systems, including fiber distribution hubs that may be easily expanded or reconfigured.

SUMMARY

According to one aspect of the present disclosure, there is provided a modular pedestal distribution hub. The modular pedestal distribution hub includes a pedestal and a cover attaching to and covering a portion of the pedestal. The pedestal includes a first pedestal section and a second pedestal section. Each of the first pedestal section and the second pedestal section are configured to be attached to form the pedestal. The cover includes a front cover and a back panel. The front cover and the back panel are configured to be attached to form the cover.

In some embodiments, the first pedestal section and the second pedestal section each comprise a plurality of pedestal walls, and each of the plurality of pedestal walls include a plurality of horizontally extending ledges and a plurality of depressions between two of a plurality of horizontally extending ledges. Further, in some embodiments, each of the plurality of pedestal walls are angled inwardly. Further, in some embodiments, each of the plurality of pedestal side walls, in each of the plurality of depressions, include a fastener aperture to receive a fastener to attach the first pedestal section to the second pedestal section. Further, in some embodiments, one of the plurality of depressions is in a shape of a truncated cone. Further, in some embodiments, the pattern of ledges and depressions on the pedestal front wall is different than the pattern of ledges and depression on the pedestal side walls. Further, n some embodiments, the pedestal front wall includes a top ledge, a first middle ledge, a second middle ledge, a bottom ledge, and a front wall depression between the top ledge, the first middle ledge, the second middle ledge, and the bottom ledge. Further, in some embodiments, the pedestal front wall includes plurality of stake fastener apertures in the front wall depression and a stake fastened to the pedestal front wall. The stake is configured to be driven into a ground to secure the pedestal to the ground.

In some embodiments, back panel comprises an interior back wall comprising a mounting wall grid. Further, in some embodiments, the mounting wall grid includes a first plurality of horizontally extending protrusions forming squares and angled lines connecting vertices of the squares. Further, in some embodiments, a component is mounted to the mounting wall grid. Further, in some embodiments, the component is a passive optical networking ("PON") insert. Further, in some embodiments, the component includes a splitter connected to a top face of the PON insert.

In some embodiments, the front cover includes an interior front wall comprising a front cover grid having a plurality of horizontally extending protrusions, including a circular protrusion, a plurality of angled linear protrusions extending out from the circular protrusion, a plurality of horizontal linear protrusions, and a plurality of vertical linear protrusions.

In some embodiments, the back panel includes a plurality of back panel side walls, each including a horizontally extending installation ledge, and each of the first pedestal section and the second pedestal section include a plurality of pedestal side walls including a receiving channel configured to receive a corresponding extending installation ledge.

In some embodiments, the front cover includes a plurality of front cover side walls that partially overlap the back panel side walls. Further, in some embodiments, the back panel side walls include a tab along a height of a respective back panel side wall. The tab is configured to receive a portion of one of the plurality of front cover side walls.

In some embodiments, a grounding is attached to the pedestal.

DETAILED DESCRIPTION

Aspects of the present disclosure provide modular pedestal distribution hubs that can be assembled without tools.

The present disclosure is not limited in terms of the particular embodiments described in this application, which are intended as illustrations of various aspects. Many modifications and variations can be made without departing from its spirit and scope, as will be apparent to those skilled in the art.

Aspects of the present disclosure provide a modular pedestal distribution hub. The modular pedestal distribution hub requires minimal tools for assembly.

Figure 1A:
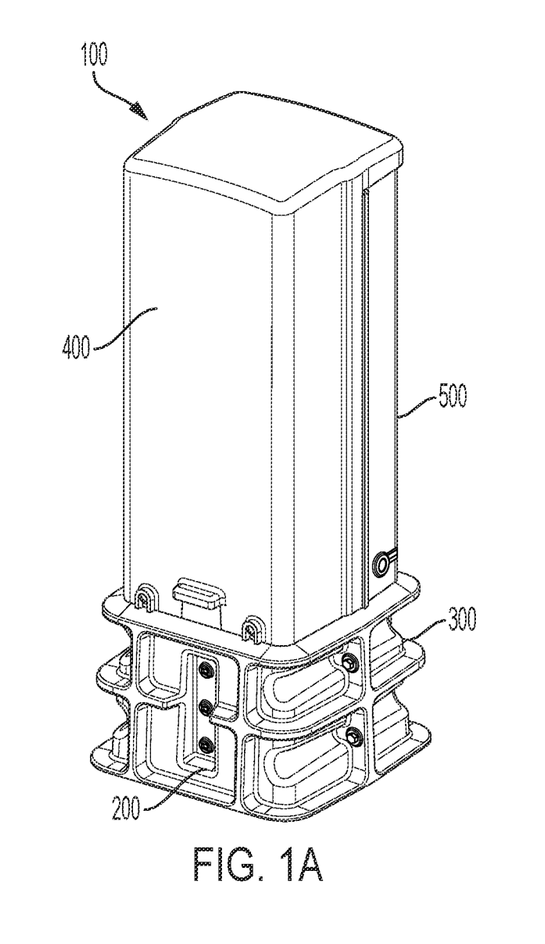
FIG. 1A is an isometric view of one embodiment of a modular pedestal distribution hub according to aspects of the present disclosure.
Figure 1B:
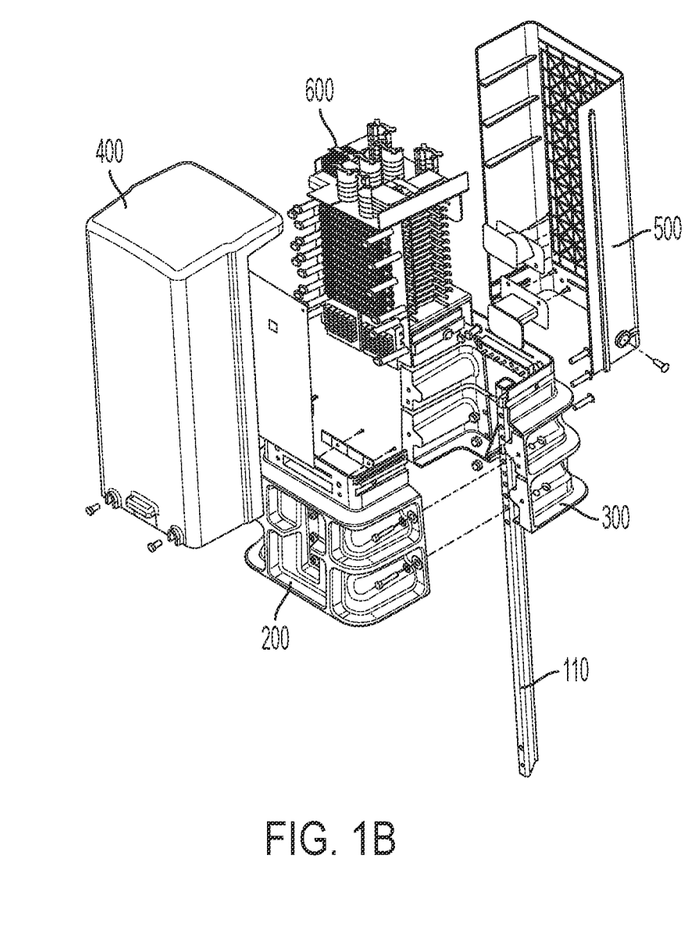
FIG. 1B is an exploded view of one embodiment of a modular pedestal distribution hub according to aspects of the present disclosure.

FIG. 1A is an isometric view of one embodiment of a modular pedestal distribution hub 100 according to aspects of the present disclosure. The distribution hub 100 can include a pedestal and a cover. The pedestal can include two sections that are connected to form the pedestal: a first pedestal section 200 and a second pedestal section 300. In an embodiment, the first pedestal section 200 and the second pedestal section 300 may be mirror images of each other such that they may be used interchangeably; in another embodiment, they are not. The pedestal, and by extension the distribution hub 100, is secured to the ground by a stake 110 (shown in FIG. 1B) that is connected to the interior of the pedestal and driven into the ground. The cover can be seated on the pedestal and can include two sections that are connected to form the cover: a front cover 400 and a back panel 500. A passive optical networking ("PON") insert for distribution to customers 600 can be installed within an interior portion of the cover and pedestal, as shown in FIG. 1B.

Some embodiments of the present disclosure may be used outdoors. Because of that, certain features of the present disclosure provide for effective water drainage. For example, in one embodiment, the walls of the pedestal may be angled inwardly, as shown in FIG. 3C. For another example, the walls of the pedestal may contain a pattern of ledges and depressions. In an embodiment, the pattern of ledges and depressions on the pedestal's side walls may be different than the pattern of ledges and depressions on the pedestal's front and side walls.

Figure 2A:
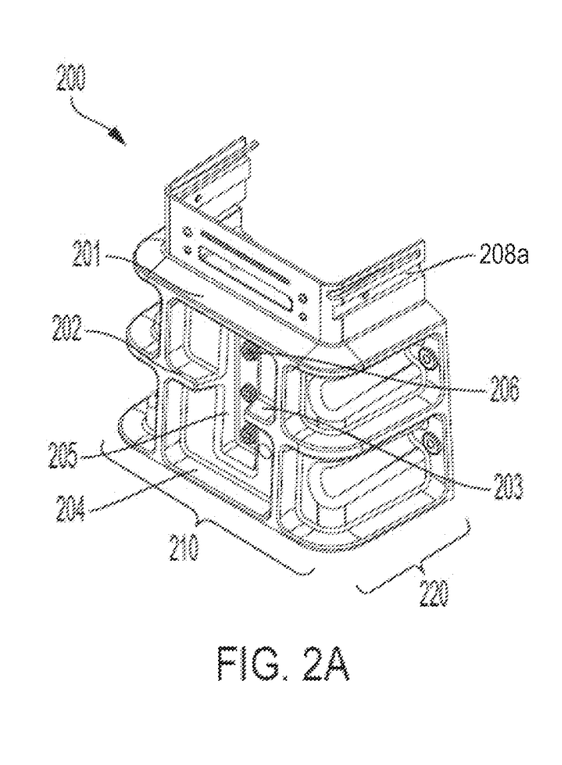
FIG. 2A is an isometric view of one embodiment of a first pedestal section showing the outside of the first pedestal section.
Figure 2B:
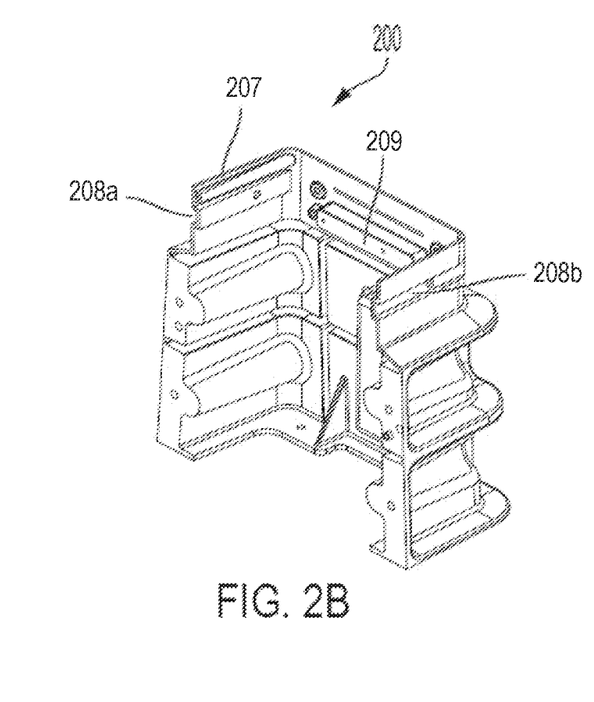
FIG. 2B is an isometric view of one embodiment of a first pedestal section showing the inside of the first pedestal section.

FIG. 2A is an isometric view of one embodiment of a base front half showing the outside of the first pedestal section 200, and FIG. 2B is an isometric view of one embodiment of a first pedestal section showing the inside of the first pedestal section 200. An embodiment of a pattern of ledges and depressions on the pedestal's front wall 210 is shown in FIG. 2A. The pattern of ledges and depressions on the pedestal's front wall 210 can include a top ledge 201, a first middle ledge 202, a second middle ledge 203, and a bottom ledge 204. The first middle ledge 202 and the second middle ledge 203 may be separated by a distance. In between that distance and in between the top ledge 201 and bottom ledge 204, there can be a depression 205. The depression may have a plurality of holes to receive fasteners 206 to attach the stake 110 to the pedestal section. The pedestal's back wall 310 can have the same pattern of ledges and depressions.

Figure 3A:
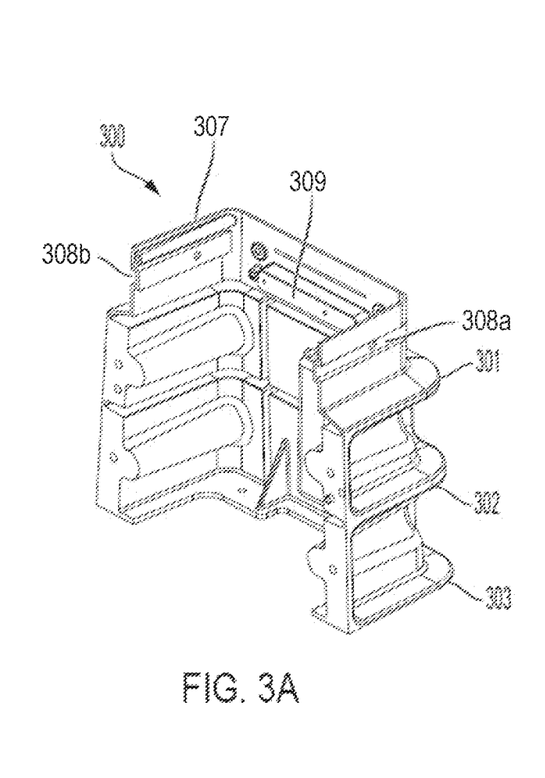
FIG. 3A is an isometric view of one embodiment of a second pedestal section showing the outside of the second pedestal section.
Figure 3B:
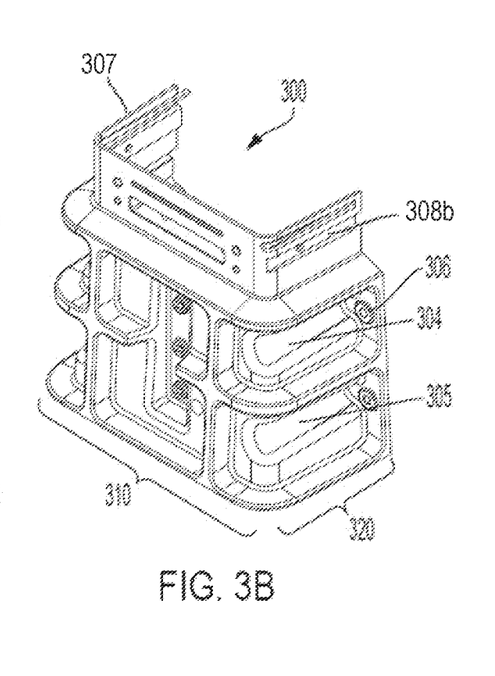
FIG. 3B is an isometric view of one embodiment of a second pedestal section showing the inside of the second pedestal section.
Figure 3C:
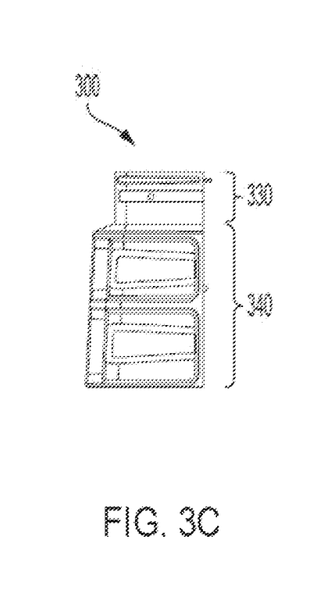
FIG. 3C is a side view of one embodiment of the second pedestal section.

FIG. 3A is an isometric view of one embodiment of a second pedestal section 300 showing the outside of the second pedestal section, and FIG. 3B is an isometric view of one embodiment of a second pedestal section 300 showing the inside of the second pedestal section 300, and FIG. 3C is a side view of one embodiment of the second pedestal section 300. An embodiment of a pattern of ledges and depression on the pedestal's side wall 320 is shown in FIGS. 3A and 3B. The pattern of ledges and depressions can include a top ledge 301, a middle ledge 302, and a bottom ledge 303. There can be a first depression 304 between the top ledge 301 and the middle ledge 302, and second depression 305 between the middle ledge 302 and the bottom ledge 303. Each depression may have the shape of a truncated cone. Each depression may have a hole to receive a fastener 306 to attach the first pedestal section 200 to the second pedestal section 300.

The modular pedestal distribution hub 100 described herein may require minimal tools for assembly. FIG. 3C is a side view of one embodiment of the second pedestal section 300. Each pedestal section can have an attachment section 330 and a pedestal section 340. The attachment section 330 may have be configured to receive and attach the back panel 500 to the pedestal. The attachment section 330 may be molded on and a part of the pedestal section 340. In some embodiments, the first pedestal section 200 and the second pedestal section 300 can include receiving channels 208a, 208b and 308a, 308b, respectively, that are configured to receive and mate with corresponding installation ledges of the back panel 500, as discussed in further detail below.

In an embodiment, the pedestal may include a grounding. For example, the first pedestal section 200 can include a grounding at location 209, and the second pedestal section 300 can include a grounding at location 309.

Figure 4A:
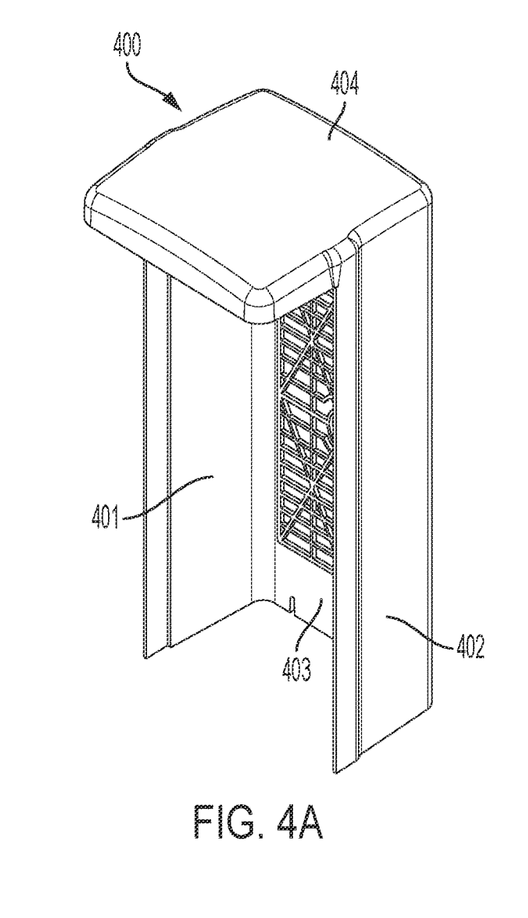
FIG. 4A is an isometric view of one embodiment of the front cover showing the inside of the front cover.
Figure 4B:
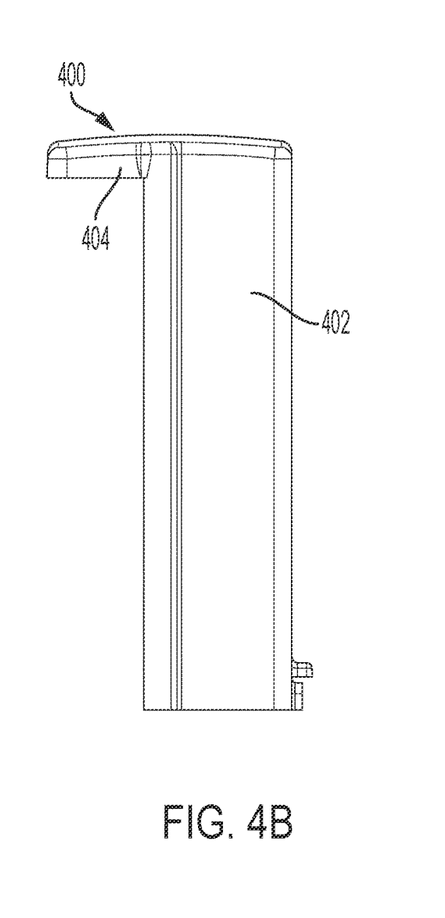
FIG. 4B is a side view of one embodiment of the front cover.

FIG. 4A is an isometric view of one embodiment of the front cover 400 showing the inside of the front cover, and FIG. 4B is a side view of one embodiment of the front cover 400. The front cover 400 can include side walls 401, 402, a back wall 403, and a top wall 404.

Figure 4C:
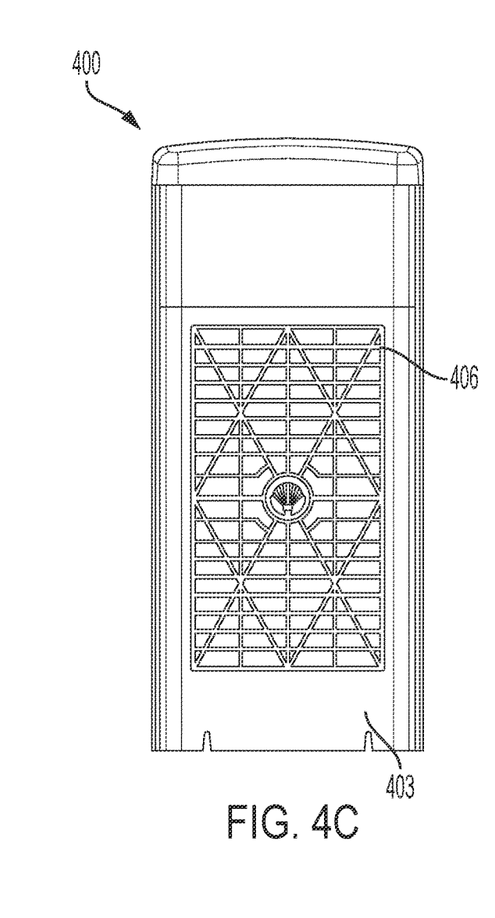
FIG. 4C is a back view of one embodiment of the front cover.

FIG. 4C is a back view of one embodiment of the front cover 400. The back wall 403 of the front cover 400 may include a grid 406 to provide strength to the front cover 400. The grid 406 can include a pattern of linear and radial protrusions.

Figure 5A:
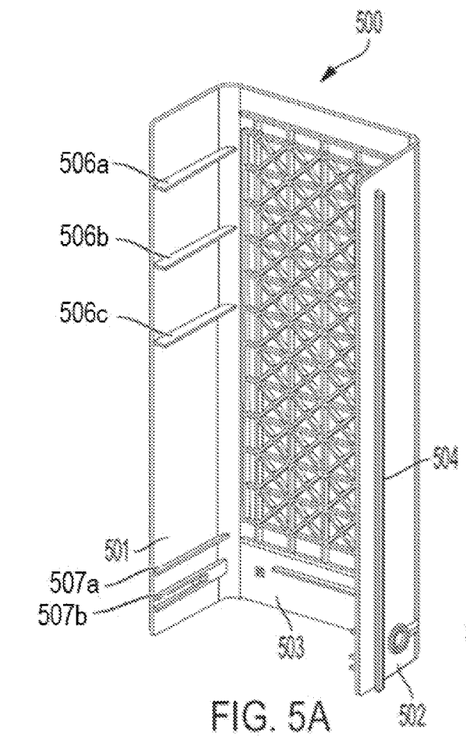
FIG. 5A is an isometric view of one embodiment of the back panel showing the inside of the back panel.
Figure 5B:
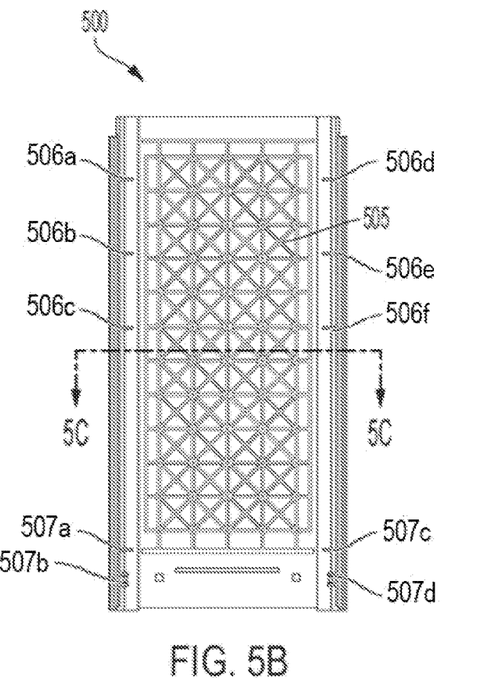
FIG. 5B is a back view of one embodiment of the back panel showing the inside of the back panel.
Figure 5C:
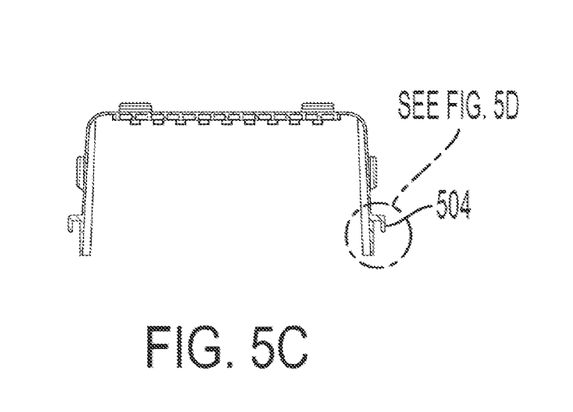
FIG. 5C is a cross-sectional view of one embodiment of the back panel.
Figure 5D:
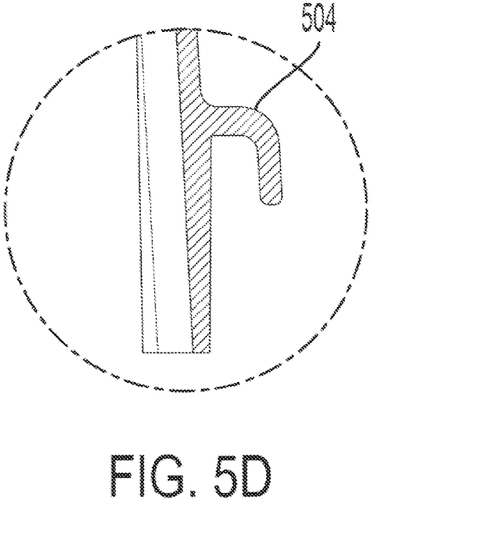
FIG. 5D is a detail view of one embodiment of a features of the back panel.

FIG. 5A is an isometric view of one embodiment of the back panel 500 showing the inside of the back panel, and FIG. 5B is a back view of one embodiment of the back panel 500 showing the inside of the back panel. The back panel 500 can include side walls 501, 502, and a back wall, 503. Each of the side walls 501, 502 may include a tab 504 that runs along the length of the side wall. The tab 504 is configured such that it can receive an end of the front cover's 400 side wall between the tab 504 and the back panel's 400 side wall. FIG. 5C is a cross-sectional view of one embodiment of the back panel 500, showing the tab 504, and FIG. 5D is a detail view of one embodiment of the tab 504.

In some embodiments, the back panel 500 has installation ledges, 507a, 507b, 507c, and 507d, on each of its side walls, 501 and 502. The bottom installation ledges, 507b and 507d, may each be configured to interface with a receiving channel; 208a, 208b, 308a, 308b; of the first pedestal section 200 or the second pedestal section 300. To connect the back panel 500 to a pedestal section, the bottom installation ledges 507b and 507d are aligned with the receiving channels (208a and 208 be or 308a and 308b), and the back panel 500 is moved into place with its bottom installation ledges 507b and 507d within the pedestal section's receiving channels and its top installation ledges 507a and 507c above the top ledge (207 or 307) of the pedestal section. Although the embodiment just described has four installation ledges, the subject matter disclosed herein is not so limited. As one of ordinary skill in the art will appreciate, a modular pedestal distribution hub 100 can include greater or fewer installation ledges and corresponding receiving channels.

FIG. 5B is a back view of one embodiment of the back panel 500. The back wall 503 of the back panel 500 may include a mounting wall grid 505. The mounting wall grid 505 may provide strength to the back panel 500, and it provides mounting options for, e.g., limiters or opticals. The mounting wall grid 505 can include a pattern of linear protrusions forming squares and angled protrusions connecting vertices of the squares.

In some embodiments, the back panel 500 has alignment ledges 506a-f. Although the embodiment shown in FIG. 5B has three alignment ledges on each side wall, 501 and 502, the subject matter disclosed herein is not so limited. Instead, as one of ordinary skill in the art will appreciate, a modular pedestal distribution hub 100 can include greater or fewer alignment ledges on one or either side wall. The alignment ledges 506a-f horizontally extend from the back panel 500 side walls 501 and 502, and are configured to interface with the alignment openings of a component (not shown).

To connect a component to the mounting wall grid 505, the alignment openings of a component are aligned with the alignment ledges 506a-f, and the component is moved into place with the alignment ledges 506a-f within the alignment openings. As such, the alignment ledges and corresponding alignment openings can facilitate proper positioning of a component on the mounting wall grid 505. The component can then be fastened to the mounting wall grid 505 of the back panel 500. Although the above description describes using alignment ledges on each of the back panel's 500 side walls 501 and 502, the subject matter herein is not so limited. Instead, a component may use one or more alignment ledges on only one side wall.

Figure 6A:
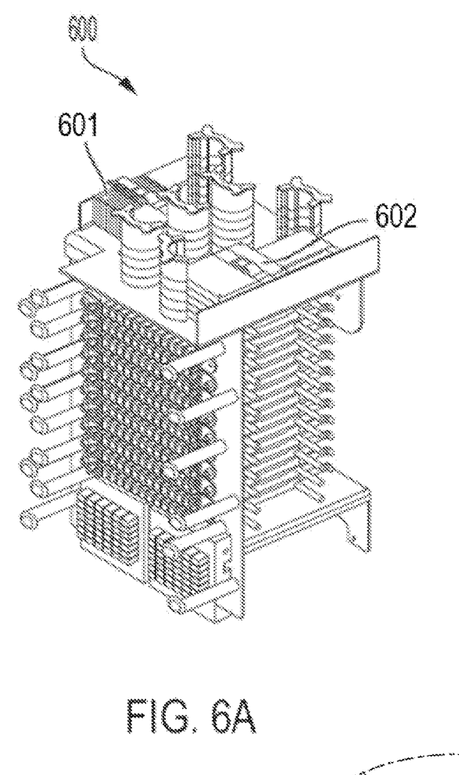
FIG. 6A is a perspective view of one embodiment of a passive optical networking ("PON") insert for distribution to customers.
Figure 6B:
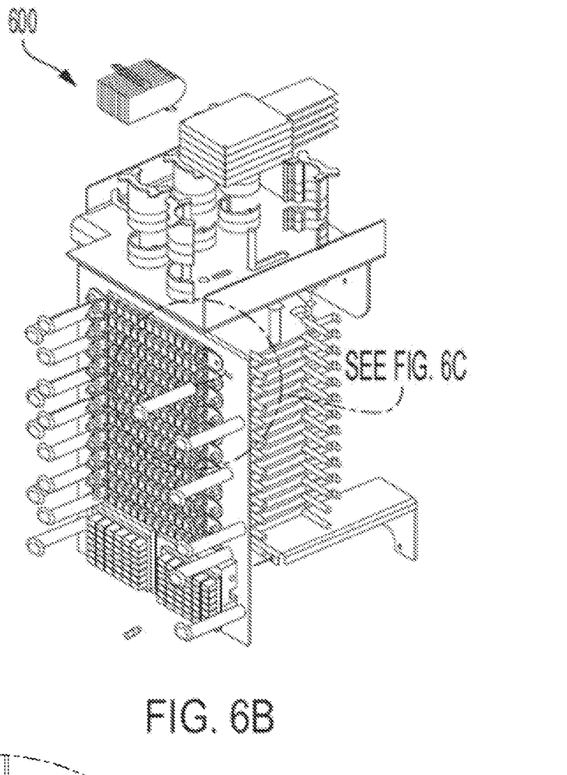
FIG. 6B is an exploded view of one embodiment of a PON insert.
Figure 6C:
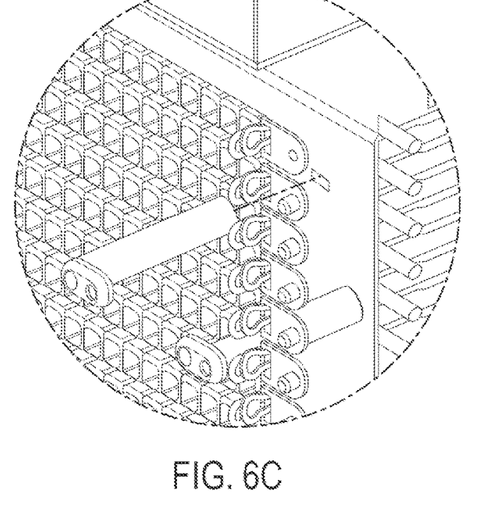
FIG. 6C is an detail view of one embodiment of a PON insert.

FIG. 6A is a perspective view of one embodiment of a passive optical networking ("PON") insert for distribution to customers. In some embodiments, a PON insert is mounted on the mounting grid wall 505. Although one embodiment of a PON insert is illustrated in FIGS. 6A-6C, many different styles and opticals like splitters may be used. FIG. 6B is an exploded view of one embodiment of a PON insert. FIG. 6C is an detail view of one embodiment of a PON insert. In an embodiment, the PON insert has one or more splitters on its top face, including, for example, an HD splitter 601 and a rugged splitter 602.

This disclosure is not limited to the particular systems, devices, and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of the various components and steps," and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

We claim:

1. A modular pedestal distribution hub comprising:
   a pedestal comprising two pedestal sections, wherein each of the two pedestal sections are interchangeable and configured to be attached to one another to form the pedestal, and wherein each of the two pedestal sections comprise an attachment section configured for attachment to a cover, and wherein the two pedestal sections each comprise a plurality of pedestal walls.

2. The modular pedestal distribution hub of claim 1, wherein each of the plurality of pedestal walls comprise:
   a plurality of horizontally extending ledges,
   wherein each of the plurality of pedestal walls forms a plurality of depressions, wherein each of the plurality of depressions is formed between two of the plurality of horizontally extending ledges.

3. The modular pedestal distribution hub of claim 1, wherein each of the plurality of pedestal walls are angled inwardly.

4. The modular pedestal distribution hub of claim 2, wherein each of the plurality of pedestal walls form, in each of the plurality of depressions, a fastener aperture therethrough to receive a fastener to attach the two pedestal sections to one another.

5. The modular pedestal distribution hub of claim 2, wherein one of the plurality of depressions is in a shape of a truncated cone.

6. The modular pedestal distribution hub of claim 1, wherein each of the plurality of pedestal walls comprises a plurality of pedestal side walls and a pedestal front wall, wherein the plurality of pedestal side walls comprises a first pattern of ledges and depressions and the pedestal front wall comprises a second pattern of ledges and depressions, wherein the first pattern is different than the second pattern.

7. The modular pedestal distribution hub of claim 1, wherein the plurality of pedestal walls comprises a pedestal front wall, wherein the pedestal front wall comprises:
   a top ledge,
   a first middle ledge,
   a second middle ledge, and
   a bottom ledge,
   wherein the pedestal front wall forms a front wall depression between the top ledge, the first middle ledge, the second middle ledge, and the bottom ledge.

8. The modular pedestal distribution hub of claim 7, wherein the pedestal front wall, in the front wall depression, forms a plurality of stake fastener apertures therethrough, the modular pedestal distribution hub further comprising:
   a stake fastened to the pedestal front wall, wherein the stake is configured to be driven into a ground to secure the pedestal to the ground.

9. The modular pedestal distribution hub of claim 1, wherein the cover comprises a back panel that comprises an interior back wall comprising a mounting wall grid.

10. The modular pedestal distribution hub of claim 9, wherein the mounting wall grid comprises a first plurality of horizontally extending protrusions forming squares and angled lines connecting vertices of the squares.

11. The modular pedestal distribution hub of claim 9, further comprising:
   a component mounted to the mounting wall grid.

12. The modular pedestal distribution hub of claim 11, wherein the component is a passive optical networking ("PON") insert.

13. The modular pedestal distribution hub of claim 12, wherein the component further comprises a splitter connected to a top face of the PON insert.

14. The modular pedestal distribution hub of claim 1, wherein the cover comprises a front cover that comprises an interior front wall comprising a front cover grid, wherein the front cover grid comprises a second plurality of horizontally extending protrusions comprising:
   a circular protrusion;
   a plurality of angled linear protrusions extending out from the circular protrusion;
   a plurality of horizontal linear protrusions; and
   a plurality of vertical linear protrusions.

15. The modular pedestal distribution hub of claim 1, wherein the cover comprises a back panel that comprises a plurality of back panel side walls and each of the two pedestal sections comprise a plurality of pedestal side walls, wherein each of the plurality of back panel side walls comprises a horizontally extending installation ledge, wherein each of the plurality of pedestal side walls form a receiving channel configured to receive a corresponding extending installation ledge.

16. The modular pedestal distribution hub of claim 1, wherein the cover comprises a front cover that comprises a plurality of front cover side walls and the cover comprises a back panel that comprises a plurality of back panel side walls,
   wherein the front cover side walls partially overlap the back panel side walls.

17. The modular pedestal distribution hub of claim 16, wherein each of the plurality of back panel side walls comprise a tab along a height of a respective back panel side wall, wherein the tab is configured to receive a portion of one of the plurality of front cover side walls.

18. The modular pedestal distribution hub of claim 1, wherein a grounding is attached to the pedestal.

* * * * *